United States Patent
Turner et al.

(10) Patent No.: US 6,718,030 B1
(45) Date of Patent: Apr. 6, 2004

(54) VIRTUAL PRIVATE NETWORK SYSTEM AND METHOD USING VOICE OVER INTERNET PROTOCOL

(75) Inventors: George W. Turner, Nepean (CA); William J. Noll, Bristol, IL (US); Paul V. Harrington, Naperville, IL (US); Rodger D. Higgins, Aurora, IL (US)

(73) Assignee: Westell Technologies, Inc., Aurora, IL (US)

( * ) Notice: Subject to any disclaimer, the term of this patent is extended or adjusted under 35 U.S.C. 154(b) by 614 days.

(21) Appl. No.: 09/636,192

(22) Filed: Aug. 10, 2000

(51) Int. Cl.[7] .................................................. H04M 7/00
(52) U.S. Cl. ................... 379/221.02; 379/289; 709/205
(58) Field of Search ............................ 379/221.15, 219, 379/289, 221.02; 709/205

(56) References Cited

U.S. PATENT DOCUMENTS

| | | | |
|---|---|---|---|
| 4,191,860 A | 3/1980 | Weber | |
| 5,247,571 A | 9/1993 | Kay et al. | 379/207 |
| 5,422,941 A | 6/1995 | Hasenauer et al. | 379/207 |
| 5,768,358 A | 6/1998 | Venier et al. | 379/207 |
| 5,892,821 A | 4/1999 | Turner | 379/220 |
| 5,920,619 A | 7/1999 | Karppinen | 379/207 |
| 6,002,759 A | 12/1999 | Kallioniemi et al. | 379/220 |
| 6,009,160 A | 12/1999 | Sonnenberg | 379/220 |
| 6,021,126 A | 2/2000 | White et al. | 370/352 |
| 6,519,242 B1 * | 2/2003 | Emery et al. | 370/338 |
| 6,529,585 B2 * | 3/2003 | Ng et al. | 379/88.03 |

FOREIGN PATENT DOCUMENTS

| | | | |
|---|---|---|---|
| CA | 2269584 | 11/1999 | H04M/11/06 |
| EP | 0880255 | 11/1998 | H04L/29/06 |
| EP | 0951157 | 10/1999 | H04L/29/06 |
| EP | 0963087 | 12/1999 | H04L/29/06 |
| GB | 2334646 | 8/1999 | H04L/12/66 |
| GB | 2337429 | 11/1999 | H04L/12/56 |
| JP | 11205335 | 7/1999 | H04L/12/28 |
| JP | 11207422 | 8/1999 | B21D/43/24 |
| JP | 11289383 | 10/1999 | H04M/3/00 |
| SE | 9700580 | 8/1998 | H04L/12/44 |
| WO | WO97/33412 | 9/1997 | H04L/12/56 |
| WO | WO98/54868 | 12/1998 | H04L/12/00 |
| WO | WO98/59467 | 12/1998 | H04L/12/46 |
| WO | WO99/05590 | 2/1999 | H04L/3/00 |
| WO | WO99/21109 | 4/1999 | G06F/17/30 |
| WO | WO99/31862 | 6/1999 | H04M/3/42 |
| WO | WO99/38310 | 7/1999 | H04M/7/00 |
| WO | WO99/45679 | 9/1999 | H04L/12/66 |
| WO | WO99/52265 | 10/1999 | H04M/7/00 |
| WO | WO99/55062 | 10/1999 | H04M/1/24 |
| WO | WO99/67922 | 12/1999 | H04L/12/00 |

\* cited by examiner

Primary Examiner—Ahmad F. Matar
(74) Attorney, Agent, or Firm—McDonnell Boehnen Hulbert & Berghoff (57) ABSTRACT

A system and method for providing a private telephone network using Voice over Internet Protocol includes an addressing scheme that supports two levels of numbers, an Internet name that identifies individual users and a Directory number, which allow the network supported by a plurality of switches to function as if the multiple customers are being served by a single switch. The system of the present invention includes a gateway in communication with both a Public Switch Telephone Network and users of the private network; a call agent in communication with the gateway for processing different requests received at the gateway; a server-based interface including a Directory Server for translating between the Internet name (Network Address) and a Customer address and a Domain Name Server for translating between the Internet name (Network Address) and an Internet Protocol Address.

20 Claims, 6 Drawing Sheets

| CUSTOMER ADDRESS IN | NETWORK ADDRESS OUT |
|---|---|
| 2001 | 313-555-2001 |
| 2002 | 313-555-2002 |
| . . . | . . . |
| 7951 | 212-555-7951 |

| NETWORK ADDRESS IN | CUSTOMER ADDRESS OUT |
|---|---|
| 313-555-2001 | 2001 |
| 313-555-2002 | 2002 |
| . . . | . . . |
| 212-555-7951 | 7951 |

VIRTUAL PRIVATE NETWORK SYSTEM AND METHOD USING VOICE OVER INTERNET PROTOCOL

FIELD OF THE INVENTION

This present invention relates to a system and method for providing communication services over a network. More specifically, it relates to a Virtual Private Network using Voice over Internet Protocol signaling.

BACKGROUND OF THE INVENTION

Virtual Private Networking is a widely deployed generic business service offering which provides customers with a closed user group environment across a plurality of physical locations. There are several subsets of Virtual Private Networking, one of the better known being Wide Area Centrex (WAC). Wide Area Centrex is generally deployed within a single local rate center and the switches are located in central offices. Virtual Private Networking is not affected by these constraints and its switches can be located in central offices or customer premises anywhere in the world, making it the closed user group superset.

The primary goal of Virtual Private Networking is to achieve a uniform private numbering plan that can be administered by the user. This goal is difficult to achieve between switches today due to telephone number assignment constraints and the limited capability of the current Signaling System 7. One current strategy involves assigning a particular customer to a single switch and using remote peripheral equipment to serve the various remote locations. This has obvious cost disadvantages in terms of underutilized facilities and non-standard administration requirements.

Traditional Voice over Internet Protocol solutions are based on translation of a Public Switched Telephone Network (PSTN) telephone number, such as, a Directory Number, into a physical Internet address associated with an endpoint or other termination. In this traditional concept, roaming is achieved by substituting various Internet addresses into the translation process to accommodate a user's change of physical location. Private numbering plans always feature an abbreviated form of dialing. This tends to be some subset of the least significant digits in the Directory Number, generally the last four.

Because Directory Numbers are assigned by the Local Exchange Carriers (LECs) or by a third party number administrator, they are not optimized to facilitate private numbering plans. Increasingly, they simply reflect the random availability of Directory Numbers in an ever-shrinking pool of available numbers. These numbers are not contiguous, and are dictated by the geographic location of the serving network's switches within the North American Numbering Plan (NANP).

Despite the above shortcomings, Directory Numbers continue to be used by the Public Switched Telephone Network world for Direct Inward Dialing (DID) towards Centrex extensions. Centrex service is a business offering which provides customers with features that are normally associated with Private Branch Exchanges. The services offered by Centrex capable central offices are shared with other business customers as well as with the Public Switched Telephone Network, thus offering a cost effective solution to provide switching and value added services. However, the use of Directory Numbers precludes a user's ability to retain a service profile while moving amongst corporate locations, either in the short or long term. A different location dictates a different private number because a different Directory Number is needed to support Direct Inward Dialing. One solution is to move completely away from numbers and introduce user names. But this introduces other limitations.

It should be noted that numerical digits are still needed in the User address for two reasons: 1) it is more convenient to type in four digits of a remembered number than all the characters in a long alphabetical name; and 2) traditional telephone sets with conventional key pads have to be supported for the foreseeable future in most customer environments. Alphabetical names in Universal Resource Locator format can be made available for users who can take advantage of them.

What is needed is a Virtual Private Network supported by a plurality of switches, located either in central offices or in customer premises to function as if the customers were served by a single switch.

SUMMARY OF THE INVENTION

The system and method of the present invention includes an addressing scheme to support two layers of numbers, a first layer of numbers that identify individual users and a second layer that identifies Directory Numbers. The user numbers are assigned by the customer's telephone system administrator, and remain with the users wherever they are located in the corporate network. They are artificial telephone numbers having no relationship whatsoever with the Directory Number, although in a preferred embodiment they consist of four digits and are set equal to the last four digits of the Directory Number. This is a default value, readily changed to another value by the system administrator should a numbering conflict arise. The only restriction on number assignment by the customer is that escape prefix digits such as "9" must be avoided. In a preferred embodiment, the Directory Number is the Network Address (NA). The artificial numbers assigned to specific users are the Customer Addresses (CA).

In a particular embodiment, the Virtual Private Network system includes a gateway in communication with both a Public Switched Telephone Network and users of the private network; a call agent in communication with the gateway for processing different requests received at the gateway and generating Network Addresses from user names; and a server-based interface including a Directory Server if needed for translating between a Network Address corresponding to a user name and a Customer Address and a Domain Name Server for translating the Network Address or Internet name to an Internet Protocol address which may then be sent to the gateway with setup instructions.

The foregoing and other features and advantages of the Virtual Private Network system and method using Voice over Internet Protocol will be apparent from the following more particular description of preferred embodiments of the system and method as illustrated in the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

The present invention is directed to a system and method for a Virtual Private Network supported by a plurality of switches that functions as if the customers were served by a single switch. The system and method includes two levels of abstraction of numbers. A first level of abstraction in the present invention is the Internet name, in the format name@bigcorp.com. A Domain Name Server (DNS) translates this name into an Internet address, and this identifies a physical termination or endpoint within the customer's network. The name component of the address is the Directory Number, in the format 3135551212@bigcorp.com. The full 10 digits of the number are required in order to prevent number conflicts in networks which span several Numbering Plan Areas (NPAs). The Internet name is a Network Address and is permanently assigned to a given Virtual Private Network line—in practice, to a phone jack.

A second level of abstraction relates the Network Address to the Customer Address and resides in a separate server such as the Directory Server, which also contains the user's service profile. Translation can proceed in either direction: Customer Addresses to Network Address; or Network Address to Customer Address. The Directory Server dynamically assigns Customer Addresses to Network Addresses, using one of a plurality of triggers such as, for example, 1) the system administrator making the assignment; 2) the user's set automatically introducing itself to the network when coupled to a phone jack; and 3) the user calling an administration phone number and performing an authentication routine. In a particular embodiment, some Network Addresses have permanently assigned Customer Addresses, such as those located in the offices of specific users. In another embodiment, the Network Addresses do not have permanently assigned Customer Address, such as those located in conference rooms, public areas, and vacant or shared offices.

In the examples which follow, all calls query the Directory Server. Once this has been done, a flag is set, and this flag travels through the corporate network as the call set-up proceeds. This minimizes and preferably prevents multiple queries of the Directory Server regarding the same call, and also ensures that no call is completed to a destination unless a query has been made. Call forwards, transfers, and conference bridging for example, functions that add legs to the basic call, are considered to be new calls.

An operating environment for the system of the present invention includes a processing system with at least one high speed Processing Unit and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "Processing United executed."

It will be appreciated that the acts and symbolically represented operations or instructions include the manipulation of electrical signals by the Processing Unit. An electrical system with data bits causes a resulting transformation or reduction of the electrical signal representation, and the maintenance of data bits at memory locations in the memory system to thereby reconfigure or otherwise alter the Processing Unit's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the Processing Unit. The computer readable medium includes cooperating or interconnected computer readable media, which exit exclusively on the processing system or is distributed among multiple interconnected processing systems that may be local or remote to the processing system.

Figure 1:
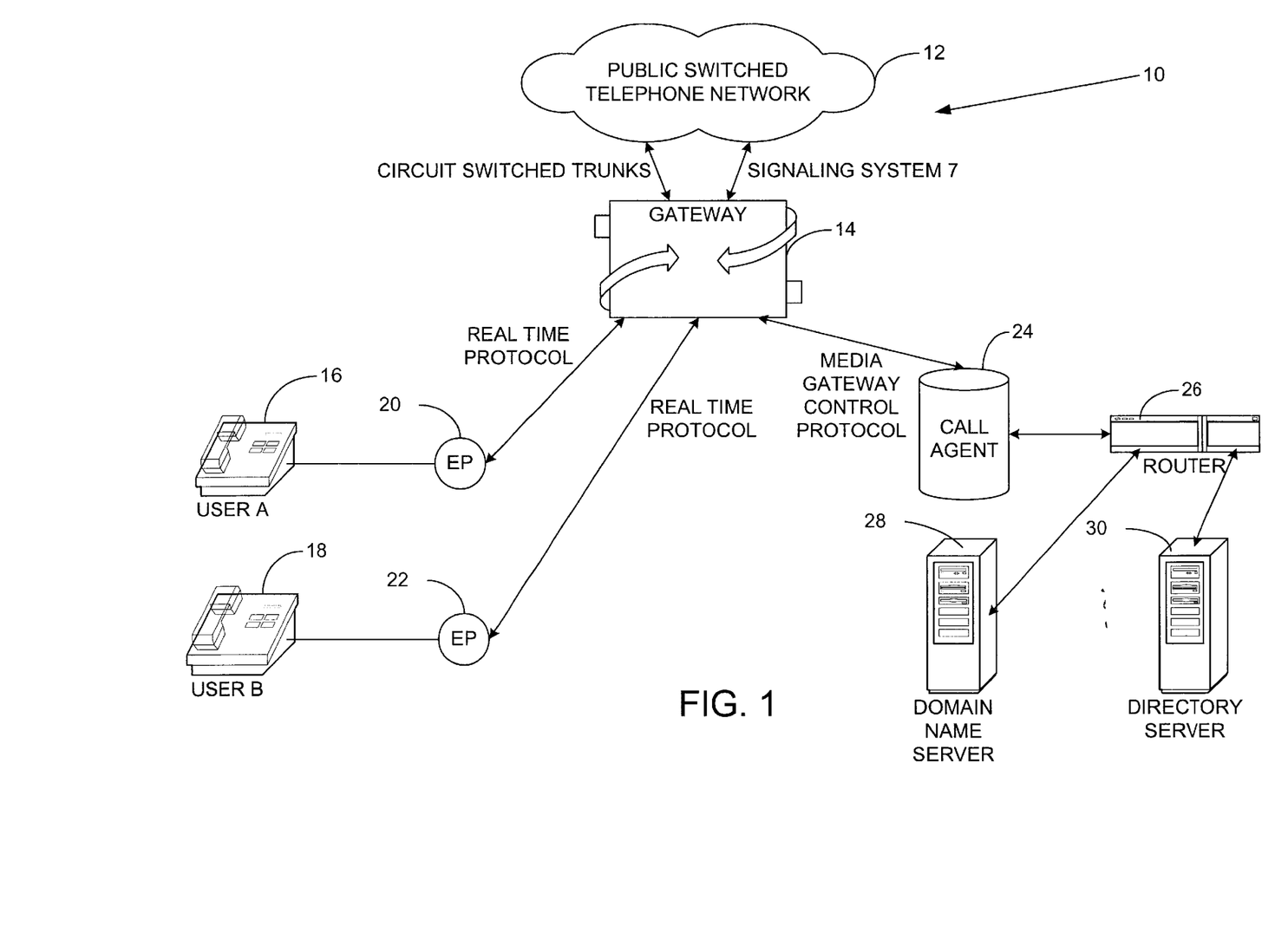
FIG. 1 is a diagram illustrating a preferred embodiment of the Virtual Private Network system using Voice over Internet Protocol in accordance with the present invention.

FIG. 1 is a diagram illustrating a preferred embodiment of the system of the Virtual Private Network in accordance with the present invention. The Virtual Private Network system 10 includes a gateway 14 which is in communication with a Public Switched Telephone Network (PSTN) 12 and multiple users such as, user A 16 and user B 18 of the private network. The Public Switched Telephone Network 12 and the gateway 14 communicate using Circuit Switched Trunks and the Signaling System 7. With respect to the Virtual Private Network system 10, Internet Protocol transfer protocols are used for communications between the users 16, 18 and the gateway 14, between the gateway 14 and the call agent 24, between the call agent 24 and the router 26, and between the router 26 and the servers 28, 30. A Real Time Protocol (RTP) which includes sequence numbers for purposes of reconstructing data in real-time order is used to communicate between users A and B with their respective endpoints 20, 22 and the gateway 14. While any suitable protocol may be used, the media (i.e., the voice signal) is preferably transported via the RTP, which itself is carried inside of a User Datagram Protocol (UDP). RTP is described in H. Schulzrinne et al., "RTP: A Transport Protocol for Real-Time Applications," IETF RFC 1889, January 1996, which is incorporated herein by reference. The gateway 14 is in communication with a call agent 24 using a Media Gateway Control Protocol (MGCP). The MGCP bridges between the circuit-based PSTN and Internet Protocol technology based networks. MGCP enables external control and management of data communications equipment operating for multi-service packet networks known as media gateways by software programs such as call agent 24. The call agent 24 includes Voice over Internet Protocol gateways. For further details regarding MGCP, see information available through the Level 3 Communications website at www.level3.com and the Bellcore website www.telcordia.com. While the preferred embodiment is described with respect to the use of MGCP, any suitable gateway control protocol may be used such as the Simple Gateway Control Protocol. The call agent 24 receives the request passed on from the gateway 14 and processes the request. The call agent 24 checks the validity of the dialed digits, and generates or assigns a Network Address for the user name received. The call agent 24 is in communication with a router 26, which in turn are in communication with a Domain Name Server 28 and a Directory Server 30. In a particular embodiment, the function of the call agent 24 may be integrated into the gateway 14.

The Virtual Private Network system 10 includes a connection to the PSTN to allow for voice connections using traditional circuit switching techniques. The Virtual Private Network system 10 also supports data transport protocols for performing Voice over Internet Protocol (VoIP) techniques on the Internet. For further details regarding VoIP, see the information available through the Internet Engineering Task Force (IETF) at www.ietf.org incorporated herein by reference.

Internal Call Handling

Figure 2:
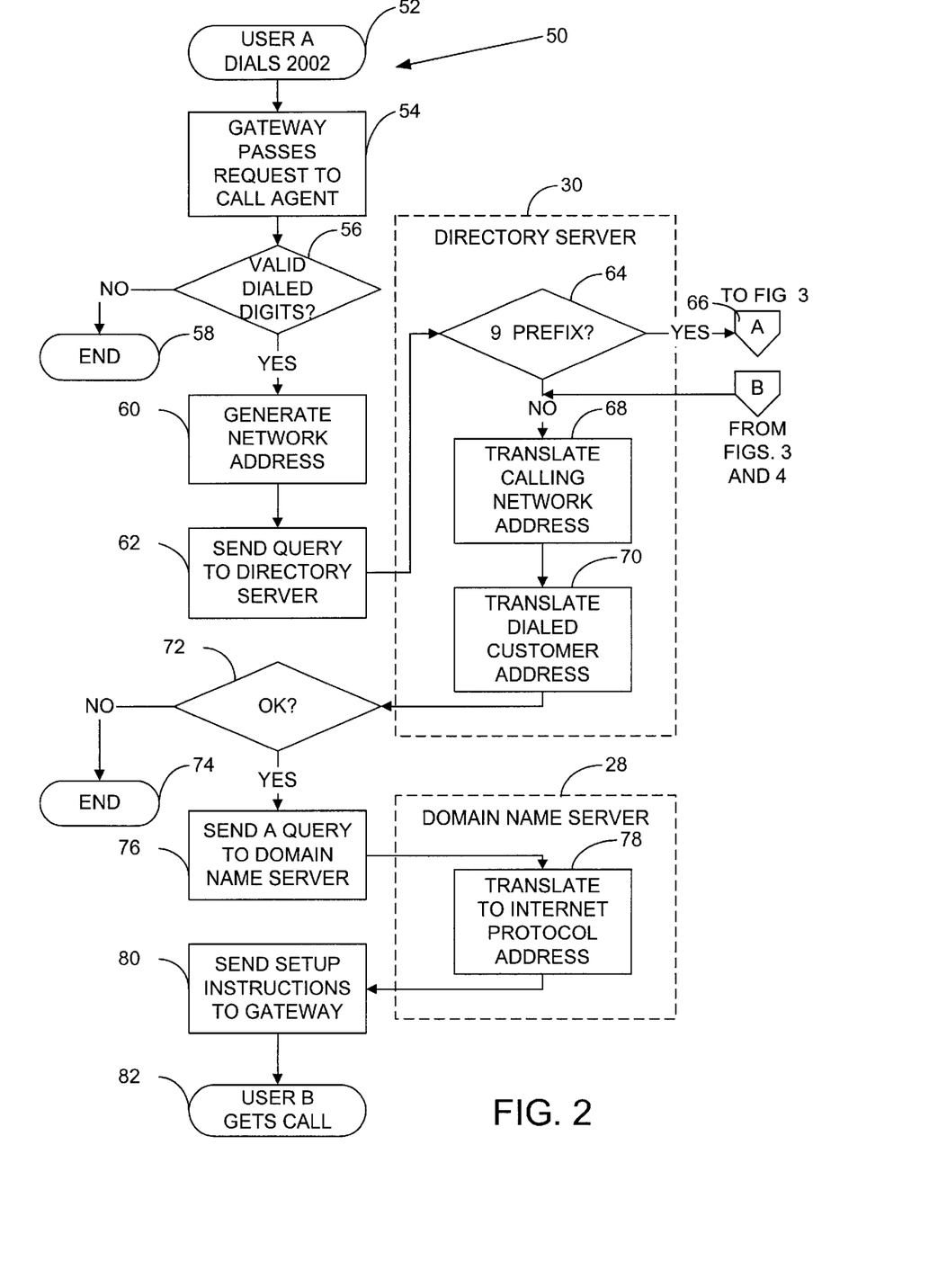
FIG. 2 is a flowchart illustrating a method for placing a telephone call within the Virtual Private-Network in accordance with a preferred embodiment of the present invention.

FIG. 2 is a flowchart illustrating a preferred embodiment of a method 50 for the handling of calls that originate and terminate within the Virtual Private Network, such as Centrex. For simplicity, it is assumed that the users are co-located, although the principle is the same regardless. It is further assumed that it is a requirement that callers be identified to the called party by number and name, both being addresses that can be called back.

User "A" has a Network Address of 313-555-2001 and a Customer Address of 2001. User "B" has a Network Address of 313-555-2002 and a Customer Address of 2002. Although the last four digits of the Network Address and Customer Address are the same in this example, and in a preferred embodiment, there is no fixed relationship between the numbers.

Figure 3:
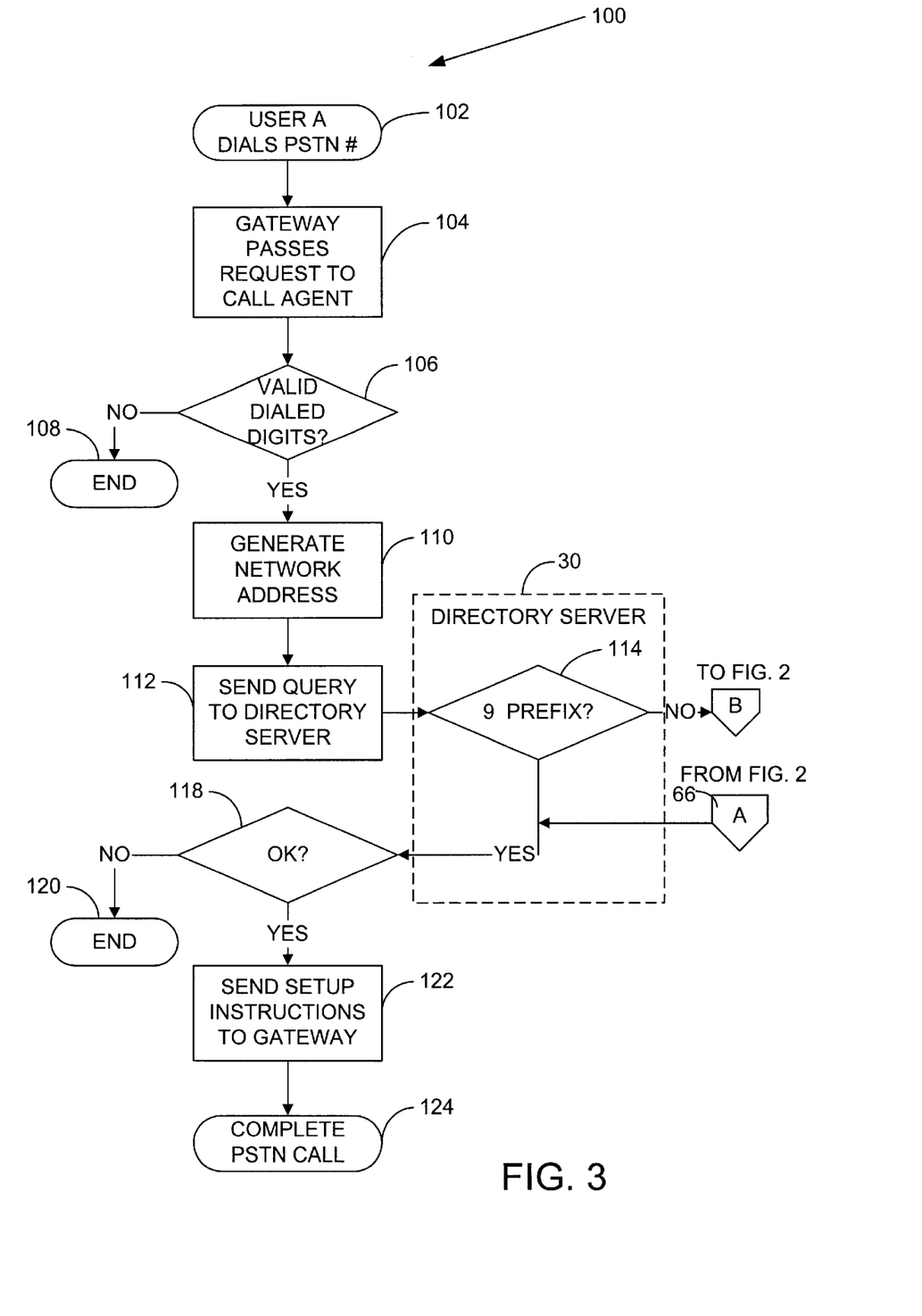
FIG. 3 is a flowchart illustrating a method for placing a telephone call outside the Virtual Private-Network in accordance with a preferred embodiment of the present invention.

Per step 52, user "A" dials 2002 to reach user "B". At step 54, the call agent associated with the location of the user "A" receives a Customer Address (2002) from the user as the dialed number and assigns a Network Address (313-555-2001) as the calling user's location. The call agent uses a table lookup between the Internet Protocol address and the Network Address to provide the assigned Network Address. The call agent at step 56 also checks for the validity of the dialed digits by checking the numbering plan information and then generates the Network Address per step 60. The call agent performs fixed lookups between an Internet Protocol address and a Network Address. At step 62, a query is launched to the Directory Server 30, which performs a dynamic, dual translation, converting the Customer Address to a Network Address and vice versa. Thus, the dialed 2002 becomes 313-555-2002, and the caller's identity becomes 2001. The Directory Server checks to see if there is an escape prefix, such as the conventional digit "9" preceding the dialed numbers per step 64. At step 66, if there is an escape prefix present then the methodology of the call as discussed with respect to FIG. 3 is followed. If the escape prefix is not present then the network address of the calling party is translated into a customer address per step 68. The dialed Customer Address is then translated into a Network Address per step 70. The call agent then composes the Internet name for user "B"—i.e., 3135552002@bigcorp-.com and sends a query to the Domain Name Server (DNS) per step 76. The DNS uses the Internet name to generate an Internet address per step 78 that accesses the endpoint where user "B" is currently located. At step 80, setup instructions are sent to the gateway 14. At step 82, user "B" receives a caller identity display which shows the calling number as 2001 and the calling name as "Jon Smith". The calling user's name is provided by the Directory Server.

External Call Handling

Figure 4:
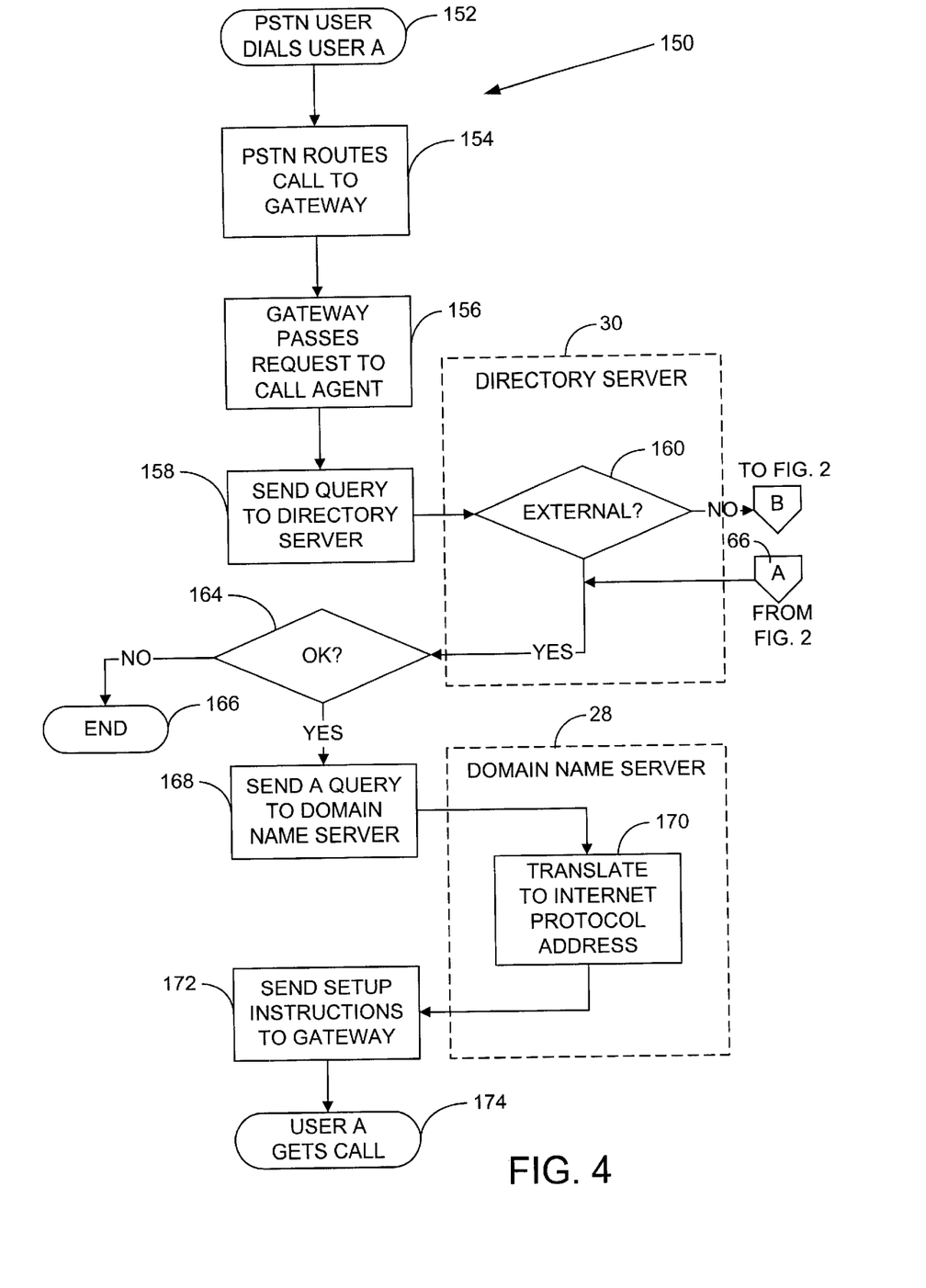
FIG. 4 is a flowchart illustrating a method for receiving a telephone call from outside the Virtual Private Network in accordance with a preferred embodiment of the present invention.

FIGS. 3 and 4 are preferred embodiments of methods illustrating external call handling according to the present invention. It is customary in a Virtual Private Network such as in a Centrex environment to use an escape digit to reach the PSTN, and this is typically the digit "9".

Thus, as stated earlier, Customer Addresses cannot begin with the digit "9". Caller Identity numbers delivered to the PSTN, in addition to being numbers that can be called back, may reflect the physical location of the calling station. This is important for accurate billing, screening, and routing, as well as for proper operation of the 911 emergency service. There are no preconditions or constraints on the calling name and can either be the user's private name or a corporate name, at the customer's option.

In the exemplary embodiment 100 as illustrated in FIG. 3, the aforementioned user "A" dials the PSTN number, 9-313-555-7860 per step 102. At step 104, the call agent associated with user "A" receives the full PSTN number plus the escape prefix as the dialed number. The call agent checks the validity of the dialed digits by checking for numbering plan information at step 106. If the dialed digits are valid then the call agent assigns a Network Address (313-555-2001) as the caller's identity per step 110. A query is launched to the Directory Server 30 per step 112, which in this case recognizes the escape code and declines to translate either the Network Address or the Customer Address at step 114. Both the dialed number and the caller's ID are returned to the call agent unchanged except for the absorption of the escape prefix. Nonetheless, the Directory Server 30 provides other useful functions such as user or location specific screening of long distance or overseas calls (at the customer's option), and selecting the appropriate calling name for outside calls from this user or location. At step 122, the call agent sends setup instructions to the gateway 14 and the PSTN call is completed at step 124.

In FIG. 4, the method 150 includes the PSTN subscriber at 313-555-7860 returns a call to Centrex user "A" by dialing 313-555-2001 per step 152. The PSTN routes this call via conventional means to the switch or Internet gateway serving the location with the 313-555 Central Office (CO) code per step 154. For simplicity in this preferred embodiment, it is assumed that the PSTN destination is the gateway with the call agent for User "A". At step 158, the call agent launches a query to the Directory Server 30 with the received dialed digits, the caller's identity, and an indicator that this call came from the PSTN. The Directory Server recognizes this request at step 160 as being associated with a call from the PSTN and declines to translate either the dialed number or the PSTN caller's ID. Both the dialed number and the caller's ID are returned to the call agent unchanged. Nonetheless, as in the case of outgoing calls, the Directory Server provides other useful functions. If the Network Address has an assigned user (i.e., an associated Customer Address), the Directory Server tests for an indication of whether the user has roamed. If so, the dialed number is translated into the associated Customer Address and a lookup is performed for the current Network Address. The current Network Address is returned to the call agent instead of the dialed Network Address. Upon receipt of the Network Address (either the dialed number or a substitute provided by the Directory Server), the call agent composes an Internet name—i.e., 3135552001@bigcorp.com. The call agent sends a query to the DNS per step 168. The DNS then uses the Internet name to establish an association with the physical endpoint where user "A" is currently located per step 170. At step 172, the call agent sends call setup instructions to the gateway and the user A gets the call per step 174.

Roaming

The preferred embodiment differs from existing schemes in that the Caller Identification (ID) number passed to the PSTN always identifies the caller's current physical location as opposed to the home base number of the caller. This embodiment has numerous advantages for the user who has roamed in relation to a corporate location in a different rate center. For example, 1) unanswered calls to local contacts can be returned with a local call; 2) calls where the caller ID is used by the PSTN's Advanced Intelligent Network (AIN) to reach the nearest dealer (or equivalent) will be handled correctly; 3) an emergency call to 911 will work properly.

In an exemplary embodiment, user "A" roams to a foreign corporate location and connects the assigned portable phone into a physical telephone jack associated with Network Address 212-555-7951. Assuming a self-identifying phone, an IP communication takes place between the telephone and the Directory Server. Until further notice, the Customer Address 2001 is mated with the Network Address 212-555-7951. In another embodiment, the same effect can be achieved using an existing phone by requiring the roaming user to call a system administration number and provide a user name and password. At the same time, the Directory Server sets a flag on Network Address 313-555-2001, indicating that the assigned user has roamed away, but can now be reached at another location. This flag is needed so that incoming calls from the PSTN can be intercepted and re-directed.

User "A", who is now in a foreign location, calls user "B" by dialing 2002. The call agent associated with user "A's" current location launches a query to the Directory Server. Upon recognizing that the calling and called parties are internal, the latter performs the usual dual translation—the dialed number is converted from a Customer Address to a Network Address, and the caller's identity is converted from a Network Address to a Customer Address, as described earlier. User "B" sees the caller's ID as the familiar 2001, despite the fact user "A" has roamed to a different location. User "B" can call user "A" by repeating the process in the opposite direction, except that the Directory Server now translates the dialed Customer Address (2001) directly into the foreign Network Address 212-555-7951 (instead of the normally assigned 313-555-2001). Upon receipt of this translated number, the foreign call agent composes an Internet Name—i.e., 2125557951@bigcorp.com, which is used by the DNS to find user A at the current physical location.

User "A" dials 9-212-555-1234 to reach a number that resides in the PSTN. The associated call agent queries the Directory Server, as in all the previous examples. Consistent with the details regarding roaming presented hereinbefore, the Directory Server allows the physical Calling Line Identification (CLID) or Caller ID of the roaming user's location to be passed to the PSTN. However, at the calling user's pre-defined option, the name from the user profile may be used in the calling name field. Thus, the called party sees either "Jon Smith at 212-555-7951" or "BigCorp at 212-555-7951". As in the case of an incoming call to a non-roaming user (as described earlier), the returned call from the PSTN, destined for 212-555-7951, is passed through to user "A" without translation of the dialed number and the CLID, although it is still passed to the Directory Server and the Directory Server makes this decision, as in the case of the other examples.

In another preferred embodiment, if someone in the PSTN calls user "A's" home number, 313-555-2001, during the interval that user "A" is logged on at the foreign location. The Directory Server finds the flag set against this number indicating that the assigned user has roamed away and can be reached elsewhere. The dialed Network Address (313-555-2001) is then translated into its permanently associated Customer Address (2001) and presented for re-translation back into the correct Network Address. This translation from Customer Address to Network Address yields 212-555-7951, and the call is routed via the corporate network to the appropriate endpoint.

When a user is in a roaming situation, and has been identified as such to the Directory Server, the foreign call agent polls the self-identifying set before attempting to set up an incoming call. If the set does not respond, the call agent advises the Directory Server to cancel the roaming status by clearing the aforementioned flag. The originating call agent is then requested to retry the call, resulting in the call receiving appropriate treatment if the user is unavailable. Users who log on manually through the administration interface may be required to log off, or may be logged off automatically if there is no activity for a pre-determined interval of time.

Figure 5A:
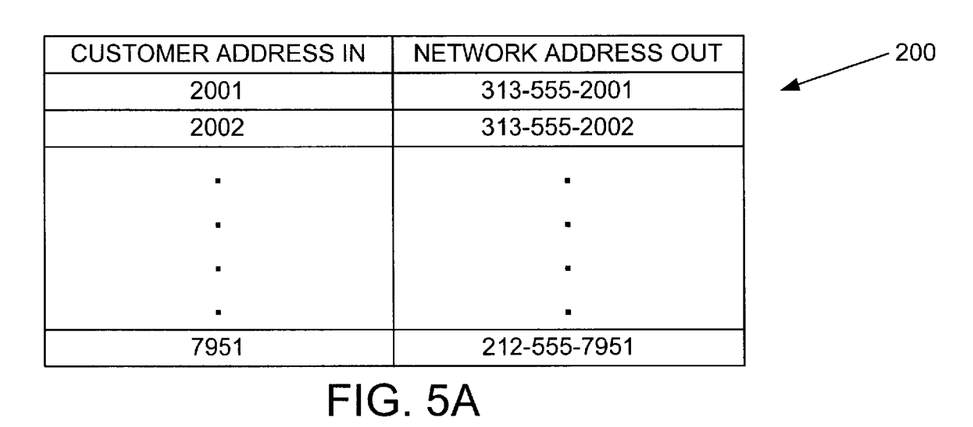
FIGS. 5A, 5B and 5C are translation tables for use with the Virtual Private Network system and method in accordance with the present invention.
Figure 5B:
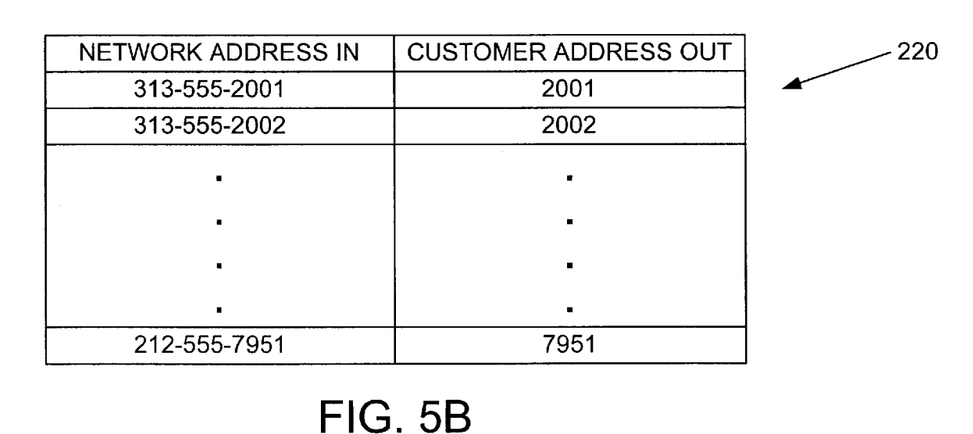
Figure 5C:
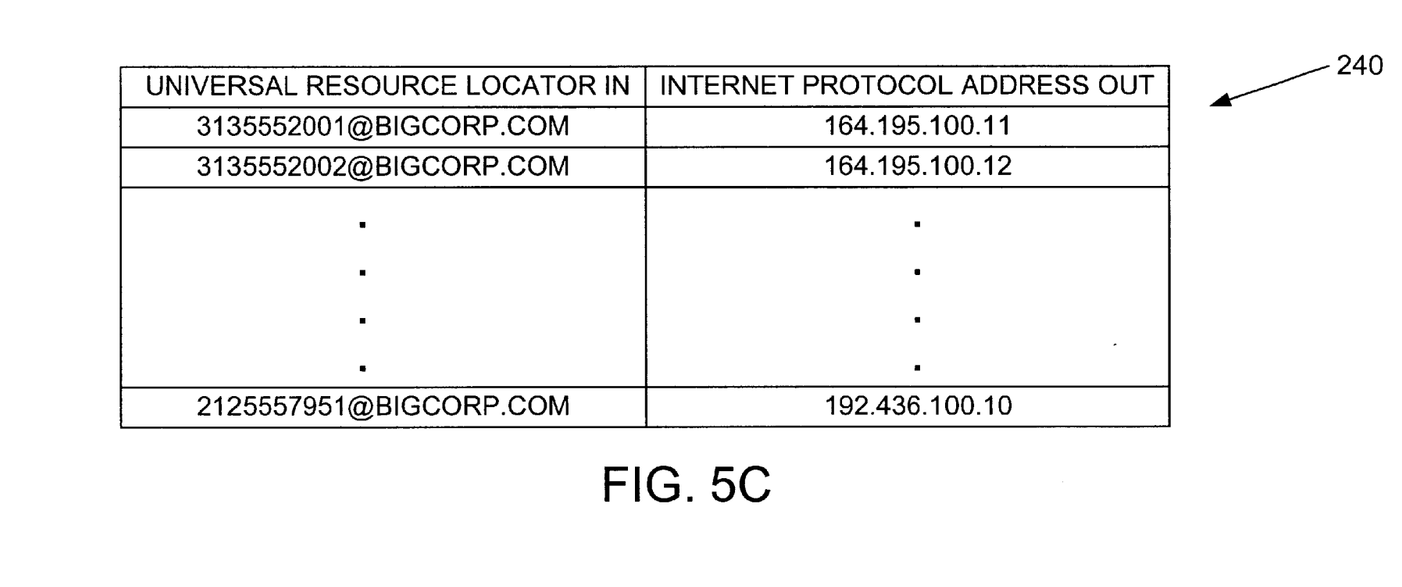

FIGS. 5A through 5C illustrate the necessary translation tables according to the present invention. The translation table 200 in FIG. 5A represents the translation of a Virtual Customer Address into a Network Address. The translation table 220 of FIG. 5B represents the translation of the Network Address into a Customer Address. FIG. 5C represents a translation table 240 between a Universal Resource Locator and an Internet Protocol address.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the Virtual Private Network system and method for using Voice over Internet Protocol may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A telephone network system for providing a private network comprising in combination:
   - a gateway in communication with a Public Switched Telephone Network and with a plurality of private users;
   - a call agent in communication with said gateway for processing a plurality of requests received for the private users at said gateway;

a Directory Server coupled to the gateway, the Directory Server translating between Network Addresses for the private users and Customer Addresses for requests within the plurality of private users, wherein the Customer Addresses are statically assigned to the private users, and wherein the Directory Server dynamically alters which Network Addresses correspond to the Customer Addresses based on locations of the private users within the private network; and a Domain Name Server coupled to the gateway, the Domain Name Server translating the Network Addresses to Internet Protocol addresses, wherein associations between the Network Addresses and the Internet Protocol are statically assigned.

2. The telephone network system of claim 1, further comprising a router in communication with the call agent, the Directory Server and the Domain Name Server.

3. The telephone network system of claim 1, wherein the gateway and the call agent communicate using a Media Gateway Control Protocol.

4. The telephone network system of claim 1, wherein the plurality of private users communicate with the gateway using a Real Time Protocol.

5. The telephone network system of claim 1, wherein the gateway communicates with the Public Switched Telephone Network using at least one of Circuit Switched Trunks and Signaling System 7.

6. The telephone network system of claim 1, wherein the Directory Server determines if the plurality of requests are one of a Public Switched Telephone Network request and a request from one of the plurality of private users.

7. The telephone network system of claim 1, wherein the call agent generates Network Addresses from the plurality of user names.

8. A method of implementing a telephone network system for providing a private network comprising:

receiving a call request at a gateway from at least one of a Pubic Switched Telephone Network and a plurality of private users;

translating between a Network Address associated with the call request in a Directory Server and a Customer Address for calls between the plurality of private users, wherein Customer Addresses are statically assigned to the private users, and wherein the Directory Server dynamically alters which Network Addresses correspond to the Customer Addresses based on physical locations of the private users within the private network; and translating between the Network Address and an Internet Protocol address in a Domain Name Server.

9. The method of claim 8, further comprising generating a Network Address from a user name.

10. The method of claim 8, wherein the step of translating a Network address includes the Directory Server determining if the call request is associated with one of the Public Switched Telephone Network and the plurality of private users.

11. The method of claim 8, further comprising passing the call request from the gateway to a call agent.

12. The method of claim 10, wherein the step of determining if the call request is associated with one of the Public Switched Telephone Network and the plurality of private users further comprises determining if the dialed digits are preceded by an escape prefix.

13. A computer readable medium having stored therein a set of instructions for causing a Processing Unit to execute the steps of the method of claim 8.

14. A telephone network system for providing a private network comprising in combination:

a Public Switched Telephone Network;

an Internet Protocol Network in communication with the Public Switched Telephone Network; and a server-based interface for translating between at least one address on the Public Switched Telephone Network and at least one address on the Internet Protocol Network, wherein the server-based interface uses statically assigned Customer Addresses for calls between devices on the private network, wherein the server-based interface uses associations between the Customer Addresses and Network Addresses that are dynamically alterable based on locations of the devices within the private network, and wherein the server-based interface uses static associations between the Network Addresses and Internet Protocol addresses.

15. The telephone network system of claim 14, wherein the server-based interface includes a Directory Server and a Domain Name Server.

16. The telephone network system of claim 14, wherein the Public Switched Telephone Network and the Internet Protocol Network communicate using a Media Gateway Control Protocol.

17. A method of implementing a telephone network system for providing a private network comprising:

providing a Public Switched Telephone Network;

providing an Internet Protocol Network in communication with the Public Switched Telephone Network; and translating between at least one address on the Public Switched Telephone Network and at least one address on the Internet Protocol Network using a server-based interface, wherein the step of translating includes:

translating between a Customer Address statically assigned to a device and used for communication between devices on the private network and a Network Address, wherein the association of the Network Address with the Customer Address is dynamically alterable based on the location of the device within the private network.

18. The method of claim 17, wherein the server-based interface includes a Directory Server and a Domain Name Server.

19. The method of claim 17, wherein the step of translating includes translating between a Network Address and a Customer Address using a Directory Server and translating between the Network Address and an Internet Protocol address using a Domain Name Server.

20. A computer readable medium having stored therein a set of instructions for causing a processing unit to execute the steps of the method of claim 17.

* * * * *